(12) United States Patent
Bloom

(10) Patent No.: US 11,663,668 B1
(45) Date of Patent: May 30, 2023

(54) APPARATUS AND METHOD FOR GENERATING A PECUNIARY PROGRAM

(71) Applicant: Diane Money IP LLC, Chicago, IL (US)

(72) Inventor: William Bloom, Chicago, IL (US)

(73) Assignee: Diane Money IP LLC, Chicago, IL (US)

( * ) Notice: Subject to any disclaimer, the term of this patent is extended or adjusted under 35 U.S.C. 154(b) by 0 days.

(21) Appl. No.: 17/866,330

(22) Filed: Jul. 15, 2022

(51) Int. Cl.
  *G06Q 40/06* (2012.01)
  *G06N 20/00* (2019.01)

(52) U.S. Cl.
  CPC ............. *G06Q 40/06* (2013.01); *G06N 20/00* (2019.01)

(58) Field of Classification Search
  CPC ................................ G06Q 40/06; G06N 20/00
  USPC ........................................................ 705/36 R
  See application file for complete search history.

(56) References Cited

U.S. PATENT DOCUMENTS

2019/0180358 A1* 6/2019 Nandan ................ G06K 9/6219
2022/0292525 A1* 9/2022 Ash ....................... G06F 16/951

* cited by examiner

*Primary Examiner* — Lindsay M Maguire
*Assistant Examiner* — Bernadine Lothery
(74) *Attorney, Agent, or Firm* — Caldwell Intellectual Property Law

(57) ABSTRACT

An apparatus and method for generating a pecuniary program, the apparatus including a computing device, configured to receive a user input relating to a user; receive pecuniary data relating to a user; identify a plurality of trends in the pecuniary data; generate a first training data set including: at least a priority scoring criteria; and a plurality of a plurality of identified trends in pecuniary data relating to the user; classify at least an element of the user input to a priority score using a first machine learning model, wherein classifying the at an element of the user input includes training a first machine machine-learning model, as a function of the first training data set, and generate a pecuniary program for the user as a function of the priority score.

20 Claims, 7 Drawing Sheets

US 11,663,668 B1

APPARATUS AND METHOD FOR GENERATING A PECUNIARY PROGRAM

FIELD OF THE INVENTION

The present invention relates to the field of pecuniary programs. In particular, the present invention is directed to an apparatus and method for generating a pecuniary program.

BACKGROUND

Current pecuniary programs do not fully consider the pecuniary trends of a user. There is a need for a pecuniary program incorporating the pecuniary trends of user and optimizing user feedback.

SUMMARY OF THE DISCLOSURE

In an aspect, an apparatus for generating a pecuniary program, the apparatus including a computing device, wherein the computing device includes: at least a processor; and a memory communicatively connected to the at least processor, the memory containing instructions configuring the at least processor to: receive a user input relating to a user; receive pecuniary data relating to a user; identify a plurality of trends in the pecuniary data; generate a first training data set including: at least a priority scoring criteria; and a plurality of a plurality of identified trends in pecuniary data relating to the user; classify at least an element of the user input to a priority score using a first machine-learning model, wherein classifying the at an element of the user input includes training a first machine machine-learning model, as a function of the first training data set, and generate a pecuniary program for the user as a function of the priority score.

In another aspect, a method for generating a pecuniary program, the method including: receiving, using a computing device, a user input relating to a user; receiving using a computing device, pecuniary data relating to a user; identifying, using the computing device, trends in pecuniary data; generating, using the computing device, a first training data set including: at least a priority scoring criteria; and a plurality of identified trends in pecuniary data relating to the user; classifying, using the computing device, at least an element of the user input to a priority score using a first machine-learning model, wherein classifying the at an element of the user input includes training a first machine machine-learning model, as a function of the first training data set using the computing device; and generating, using the computing device, a pecuniary program for the user as a function of the priority score.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating a pecuniary program.

Aspects of the present disclosure can be used to aid a person in reaching a pecuniary goal through educational tools proving pecuniary literacy and building pecuniary management skills.

Aspects of the present disclosure allow for a person to optimize their pecuniary resources in achieving a pecuniary goal by identifying and incorporating personal pecuniary trends related to the person using machine-learning process to continuously update and mold a personalized pecuniary program for the person. Exemplary embodiments illustrating aspects of the present disclosure are described below in the context of several specific examples.

Figure 1:
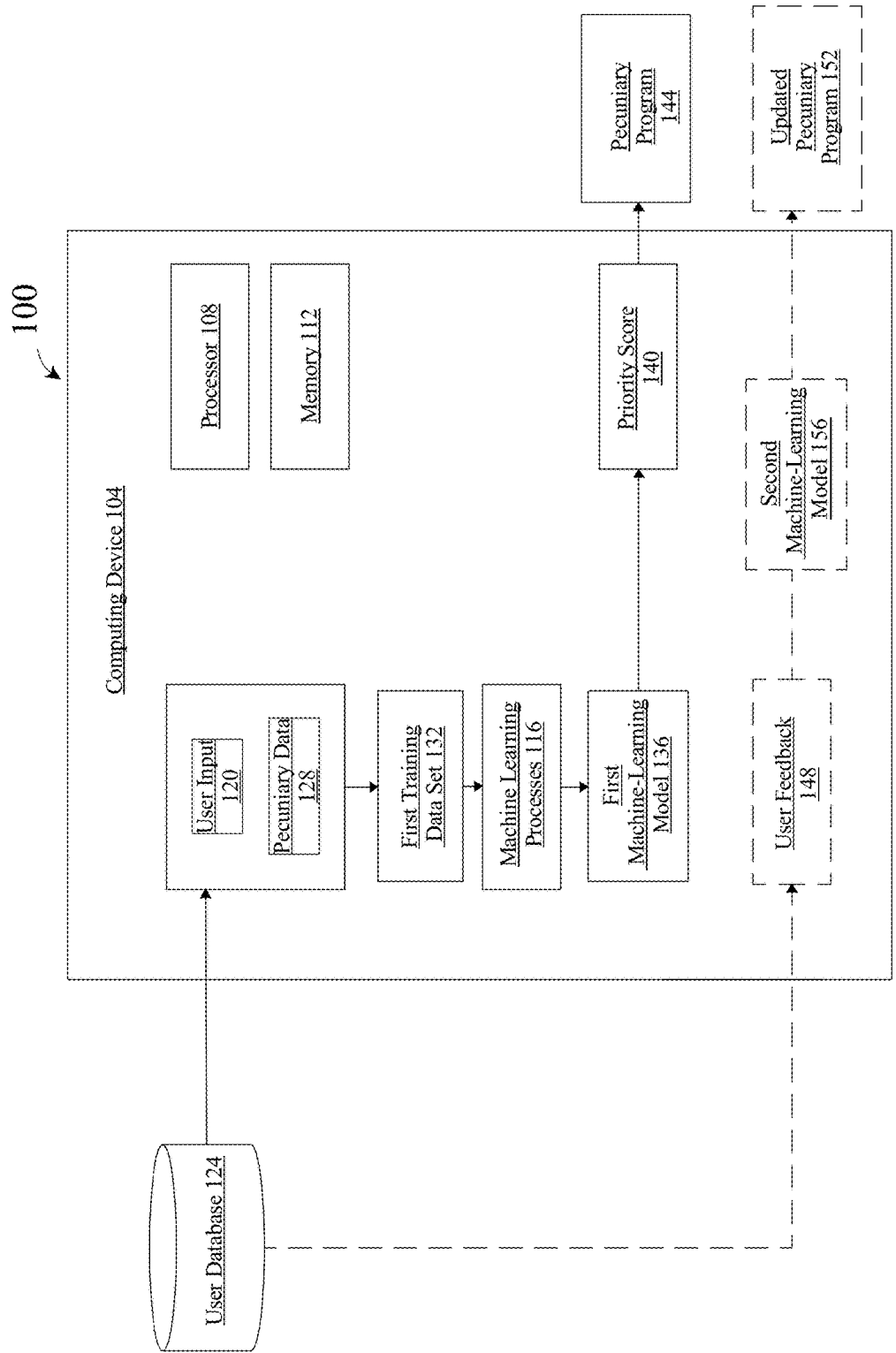
FIG. 1 in an exemplary embodiment of an apparatus for generating a pecuniary program.

Referring now to FIG. 1, an exemplary embodiment of an apparatus 100 for generating a pecuniary program is illustrated. Apparatus 100 includes a computing device 104. Computing device 104 includes a processor 108 and a memory 112 communicatively connected to the processor 108, wherein memory 112 contains instructions configuring processor 108 to carry out the linking process. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, additionally, computing device 104 may perform determinations, classification, and/or analysis steps, methods, processes, or the like as described in this disclosure using machine learning processes 116. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process 116 may utilize supervised, unsupervised, lazy-learning processes and/or neural networks, described further below.

Still referring to FIG. 1, computing device 104 is configured to receive user input 120 relating to a user. "User input," as used in this disclosure, is data inputted by a user. In some embodiments, user input may include data pertaining to a user's personal information. In some embodiments, user input may include data pertaining to a user's goals. User input 120 may be stored in a user database and/or received by computing device 104 from a user database as described further below. In some embodiments, user input may be received from a computing device operated by the user, such as a remote device as described later in this disclosure. As non-limiting examples, user may input user input using a keyboard, on-screen keyboard, audio recording, and the like. A "user," a used in this disclosure is a person or entity. Personal information may include name, age, nationality, geographic location, profession, job location, property, and similar aspects. Goals may relate to pecuniary goals of a user. For example, goals may pertain to increasing income, building savings, retirement, lowering monthly expenses, building investment, investment diversity, pay offing off loans, financial budgeting, estate planning, asset protection, equity, building a financial portfolio, and similar aspirations. In some embodiments, the user input 120 may include a goal timeline. A "goal timeline," as used in this disclosure, is a time span a user would like to reach a financial goal. For example, a user may have a goal timeline of building an emergency savings account of $20,000 within by 8 months. The goal timeline may also include percentages and/or rates or growth of decline relating to the goal. For example, a goal timeline may include lowering monthly expenses by 10% in 3 months. In some embodiments, the user input 120 may include a plurality of goals varying in timelines. For example, the user input 120 may include increasing income by 30% in 6 months, building a diverse financial portfolio in 13 months, and building a retirement saving of $500 k in 5 years. The goal timeline may fluctuate based on the user input 120. For example, a user may input that they want to pay off their student loans in 2 years only if only they can reach the goal of building a savings of $50,000 in 1 year.

Still referring to FIG. 1, data relating to a user, such as user input 120 and pecuniary data, described further below, may be received from a user database 124. As used in this disclosure, a "user database 124," is a data structure containing financial, personal, and analytical information relating to a user. User database 124 may be communicatively connected to computing device 104. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, user database 124, and all other databases described throughout this disclosure, may be implemented, without limitation, as a relational database, a key-value retrieval database such as a NOSQL database, or any other format or structure for use as a database that a person skilled in the art would recognize as suitable upon review of the entirety of this disclosure. User database 124 may alternatively or additionally be implemented using a distributed data storage protocol and/or data structure, such as a distributed hash table or the like. User database 124 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, computing device 104 is configured to receive pecuniary data 128 relating to a user. As used in this disclosure, "pecuniary data," is data relating to the financial history of a user. For example, pecuniary data 128 may include income, debts, bills, credit reports, banks enrolled in, number of bank accounts, investment history, net worth, and similar forms of financial information. Pecuniary data 128 may be received from user database 124. In some embodiments, pecuniary data 128 may be received be from a third-party financial institution, wherein data from third party is used to populate user database 124. A "third-party financial institution," as used in this disclosure, is an institution with information regarding the financial history of the user. For example, a third-party financial institution may be a credit report agency, debt collection, and similar institutions. In some embodiments, and with a user's consent, a third financial institution may provide pecuniary data 128 not received from the user, such as an undisclosed debt. Pecuniary data 128 received from a third-party institution may also be used to confirm the accuracy of pecuniary data 128 received from a user.

Still referring to FIG. 1, computing device 104 is configured to identify a plurality of trends in the pecuniary data 128. Pecuniary data 128 may include financial trends of the user such as trends in user paying debts late and/or on time, trends regarding investments, trends in savings management, for example, if a user tends to excessively withdraw from a saving account in a short amount of time, trends in financial obligations, for example, if the user tends to take out loans, paycheck advances, default on payments, etc. Trends may represent a positive and/or negative financial history of the user. A positive trend may show that a user is financially stable and responsible with a financial matter, such as diligently depositing 20% of their monthly income into a savings account. A negative trend may show that a user is reckless regarding a financial matter, such as continuous overdraft fees noted in a checking account. Trends may be identified using a machine learning process including supervised processes, unsupervised process, lazy learning, and the like. For example, this may include K-Nearest Neighbors, Naïve Bayes, decision tree classification, random forest classification. In an embodiment, a language processing model may be used to correlate positive and negative trends in a user's financial history. For example, the model may identify every time the words "late", "overdraft", "insufficient funds", and the like appear in the user's pecuniary data 128. A language processing module may operate to produce a language processing model. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model. In some embodiments, documents relating to user input 120 and pecuniary data 128 may be retrieved from a database, such as user database 124. In an embodiment, documents in user database 124 may be linked to and/or retrieved using document identifiers such as URI and/or URL data, citation data, or the like; persons skilled in the art, upon reviewing the entirety of this disclosure, will be aware of various ways in which documents may be indexed and retrieved according to subject matter, author, date, or the like as consistent with this disclosure. For example, the language processing module, may specifically pull and analyze all the user's bank statements from the past year based on the name of the financial institution. Documents may include profit and loss statements, balance sheets, cash-flow statements, tax returns, pay stubs, credit reports, aging reports, loan contracts, debt notices, tuition statements, billing statements, investment portfolios, and all other forms of documents related to pecuniary data of the user. In some embodiments, pecuniary data 128 may be retrieved by computing device 104 from a financial database. The financial database, as non-limiting examples, may include a database run by a bank, a governmental database, an SEC database, a lender database, a bankruptcy database, a foreclosure database, a tax database, an IRS database, and the like. In some embodiments, the language processing module may be trained using a training data set including examples of words/syntax along with correlated synonyms to identify positive and negative trends. For example, training data may include words such as late, delinquent, defaulted, and overdraft as example of negative trends. In another example, training data may include phrases such as transfer to savings, scheduled transfers, and scheduled bills payments as positive trends. In some embodiments, the training data may include exemplary documents including pecuniary data 128 representing positive and negative trends. For example, training data may include a loan payment schedule with consistent on time payments to represent a positive trend. In another example, training data may include a bill statement with overdue payments to represent a negative trend. In some embodiments, the language processing module may use vector similarity comparison including cosine similarity and/or other geometric measures of vector similarity to compare data in documents to a threshold number, wherein the threshold number indicates if data contained in a document or plurality of documents is a positive or negative pecuniary trend. For example, bank statements relating to a user's saving account starting from the past year may be analyzed to indicate that a user's savings account falls below a certain threshold and represents a negative pecuniary trend based on the reoccurrence of a withdrawal limit fee or an excessive use fee issue by the bank. Additionally, documents from user database 124, accomplished by filling out a paper or PDF form and/or submitting narrative information, may likewise be processed using the language processing module. In some embodiments, output from the language processing module may be used as training data in machine learning models described throughout this disclosure.

Still referring to FIG. 1, language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. The algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information;

experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, computing device 104 is configured to generate a first training data set 132 including at least a priority scoring criteria and identified trends in pecuniary data 128 relating to the user. As used in this disclosure, a "priority scoring criteria" is a plurality of ranked exemplary user inputs and pecuniary data based on priority. For example, priority scoring criteria may include exemplary user input and pecuniary data showing that building a retirement plan for a 54-year-old male user living in Wisconsin with a saving account below 100 k is a high priority vs. paying off student loans for a for a 54-year-old male user living in Wisconsin being a low priority. In another example, exemplary user inputs and pecuniary data may how that teaching a teenaged user with a negative identified pecuniary trend of over withdrawal fees tools to monthly budget expenses is a higher priority vs. teaching a teenaged user with a positive trend of pecuniary investment tools to diversify their pecuniary portfolio being a lower priority. The pecuniary scoring criteria may include exemplary user input and pecuniary data relating to ideal financial stability for the average user is, such as, ideal income, savings, investments, debt balance. The pecuniary scoring criteria may be based on a national standard from the continent, country, state, city, and/or town a user resides in. Identified trends in pecuniary data 128 may be used to correlate user's goal to the priority scoring criteria. Additionally, personal information such as age, nationally, and other aspects may be populated into first training data set 132. For example, first training data set 132 may include the priority scoring criteria, pecuniary data 128, and identified trends in pecuniary data 128. User input 120 may include goals such as building a diverse financial portfolio in 1 year and building a retirement savings of $100 k in 1 year. The goals may be weighed against each other using first training data set 132 to prioritize building retirement savings over diversifying a financial portfolio based on the negative trend of low savings and the average retirement budget in the user's geographic location.

Still referring to FIG. 1, computing device 104 is configured to classify at least an element of the user input to a priority score 140 using a first machine-learning model 136, wherein classifying the at an element of the user input 120 includes training a first machine machine-learning model, as a function of the first training data set. A "priority score," as used in this disclosure is a number that represents the relative level of importance or urgency. In some embodiments, first machine learning model may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. For example, the classifier may rank building a retirement account over paying off student loans and label and/or number the retirement account with a level of high importance in addressing. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 104 is configured to generate a pecuniary program 144 for the user as a function of priority score 140. A "pecuniary program," as used in this disclosure, is a plurality of financial measures or activities with a particular long-term aim based on the user input 120. Pecuniary program 144 may include a plurality of target sets for user selection. A "target set," as used in this disclosure, is a financial plan containing steps and recommendations optimized toward one or more sets of financial based goals. In some embodiments, each target set of the plurality of target sets may include educational data relating to pecuniary literacy. "Educational data," as used in this disclosure, is data relating to financial teaching. For example, educational data may be a statement on the importance of investment diversity. Educational data may include tools such as graphs, glossaries, pictures, drawings, abstracts, videos, power points, websites, website hyperlinks, focused on educating the user on how the pecuniary program 144 works and what it means exactly. For example, breaking down complex financial terms by using more common vocabulary the average person may understand better. Educational tools may explain the differences among the ranked target sets to one another, how a credit score works, different types of investments the user can make, different type of savings account available, common resources like government financial assistance programs a user may qualify for—for example a state housing program made to aid first time homeowners in purchasing a home, and the like. As used in this disclosure, "pecuniary literacy" is the possession of the set of skills and knowledge that allows an individual to make informed and effective decisions with all their financial resources. In some embodiments, each target set of the plurality of target sets may be ranked based on achievability criteria. An "achievability criteria," as used in this disclosure, is a plurality of exemplary target sets scored/ranked based on practicality in achieving a financial goal. In some embodiments, generating pecuniary program 144 and ranking the plurality of target sets may use a machine-learning model as described above. For example, a classifier may be generated and trained using training data including exemplary target sets representing practical steps for a user to able to pay off a student loan in 6 months. In another example, an exemplary target set may include aggressive steps in building a user's saving account in a short period of time. In yet another example, an exemplary target set may include impractical but possible steps a user may follow to increase their income in a certain timeframe. Training data may include past user inputs, past pecuniary data, past pecuniary programs, and user feedback regarding ranking the plurality of target sets and generating a pecuniary program, all of which may be received from user database 124. The training data set may also include all other forms of data described throughout this disclosure. User input 120 and priority score 140 may be inputted into the classifier, wherein the output is pecuniary program 144 containing a plurality of target sets. For example, the classifier may take the pecuniary goals inputted by the user and the goals prioritized by first machine-learning model to generate and/rank target sets in pecuniary program 144. In some embodiments, ranking the plurality of target sets may include a fuzzy set comparison system as described further below. For example, a classifier may be used to generate a pecuniary program 144 containing a plurality of target sets, wherein the pecuniary program 144 is then inputted into a fuzzy set comparison system to rank the plurality of target sets based on achievability. Pecuniary program 144 may then be outputted to a remote device operated by user, such as a smart phone or laptop. A "remote device," as used in this disclosure is a computing device distinct from computing device 104. The remote device may be communicatively connected to computing device 104 as described above. In some embodiments, pecuniary program 144 may be outputted to a user on a monthly, weekly, or daily basis to continuously advise the user on how to solve issues, financial educational, and reach goals in selected the time frame. In an embodiment, the user may give permission to allow the computing device 104 to automatically access banking accounts and other information to carry out aspects of pecuniary program 144. For example, a user may give permission for the computing device 104 to access their checking account and move a certain amount of money, based on the recommendation, to the user's savings account. In another example, the user may give computing device 104 permission to access bank accounts and automatically pay off bills such as student loans, utility bills, mortgages, and the like. Authorization for computing device 104 to carry out aspects of pecuniary program 144 may include using third-party billing companies, debt consolation companies, credit agencies, and the like.

Still referring to FIG. 1, computing device 104 may receive user feedback 148 relating to the pecuniary program 144. "User feedback," as used in this disclosure, is qualitative and quantitative data from a user on their likes, dislikes, impressions, and requests about or relating to the pecuniary program 144. Computing device 104 may output to a remote device, operated by the user, an open-ended form a user may respond to with a detailed impressions of the target sets in the pecuniary program 144 suggested to the user. For example, the user may point out which target set they thought practical and which ones were far off from their needs. In an embodiment, the user may select a target set and critique it with suggestions of their own personal alterations. For example, a target ranked "efficient" may be selected by the user wherein the user may respond with critiques to update the chosen plan. The "efficient" plan may suggest paying $500 a month to pay off student loans by the end of 2022. The user may suggest that $500 is too much and suggest a tailored amount not suggested in other ranked recommendations. In an embodiment, feedback from a user may include the user pointing out which suggestions they like from each target set and/or what they did not like. User feedback 148 may be uploaded and received by the computing device through user database 124. In some embodiments, user feedback 148 may be received in the form of a questionnaire completed by the user. The questionnaire may in include standard questions regarding the quality and accuracy of pecuniary program 144 as described above. The questionnaire may include a rating system including a numerical scale a user selects a rating from. For example the questionnaire may ask "on a scale of 1-10 how likely are you to follow the efficient target set?", wherein 1 is not going to follow and 10 is committed to following the target set.

Still referring to FIG. 1, computing device 104 may generate an updated pecuniary program 152 as a function of user feedback 148. An "updated pecuniary program," as used in this disclosure, is a plurality of financial measures or activities with a particular long-term aim based on user feedback 148. In an embodiment, updated pecuniary program 152 may just be one target set combining all the feedback from the user. In an embodiment, updated pecuniary program 152 may contained a new plurality of target sets. Updated pecuniary program 152 may be generated used similar machine-learning processes and disclosed above. In some embodiments, computing device 104 may generate a second training data set, wherein the second training data set includes the achievability criteria, the priority criteria, identified trends of pecuniary data 128, and all other data described throughout this disclosure. Computing device 104 may then train a second machine learning model 156, such as a classifier, wherein pecuniary program 144 and user feedback 148 are used as inputs to output updated pecuniary program 152. For example, the second machine-learning model may be trained using a training data set including the achievability criteria, the priority criteria, identified trends of pecuniary data 128 and a plurality of past pecuniary programs associated with positive user feedback from a plurality of users stored and received from user database 124, wherein past pecuniary programs associated with positive user feedback from a plurality of users correlate to a past user input. In some embodiments, training data for second machine-learning model may be selected to contain past pecuniary programs associated with positive user feedback corresponding to similar user inputs and/or pecuniary data to user input 120 and/or pecuniary data 128 (e.g., similar pecuniary goals, similar personal information such as age, income, geographic location, etc.). User feedback 148 may be inputted into second machine learning model 156 and the second machine-learning model may output an updated pecuniary program 152. In some embodiments, updated pecuniary program 152 may be responsive to user feedback 148. In some embodiments, updated pecuniary program 132 may be outputted to a remote device.

With continued reference to FIG. 1, user feedback 148 may be classified into a feedback category using a feedback classifier. The feedback classifier may be consistent with any classifier described in this disclosure. Feedback category may include, for example, "improper prioritization," "too strenuous," "great program," and the like. Feedback classifier may be trained using feedback classification training data. The feedback classification training data may comprise, as a non-limiting example, past examples of user feedback 148 with associated feedback categories. In some embodiments, feedback classification training data may comprise past examples of user feedback 148. In some embodiments, feedback categories may be identified by identifying common keywords in user feedback using, for example, language processing. In some embodiments, feedback category may be used in the training data for second machine learning model 156. In some embodiments, training data may be selected for second machine learning model 156, where the user feedback and associated past pecuniary programs are selected so that they correspond to a certain feedback category identified by the feedback classifier.

With continued reference to FIG. 1, user feedback 148 may be used in training data sets described throughout this disclosure in order to refine the algorithm used by machine learning models in generating an output as described above. For example, user feedback 148 and the associated priority score 140 and/or pecuniary program may be used to train first machine-learning model. User feedback 148 may subsequently be added to training data sets as part of the achievability criteria and/or priority criteria. For example, user feedback stating that a target set relating to paying off loans ranked as "ideal" is actually strenuous on the user based on their fluctuating income. This information may be used to refine the achievability criteria in examples of what is an ideal target set. In some embodiments, user feedback 148 may also be used in the second training data set to generate updated pecuniary program 152. For example, example user feedback in the form of a questionnaire or opened ended format may be contain inputs by the user indicating what parts of pecuniary program 144 were good, bad, and/or how to improve target sets. As part of the training data set, the classifier may receive pecuniary program 144 as an input and compare it against the user feedback to output updated pecuniary program 152.

Figure 2:
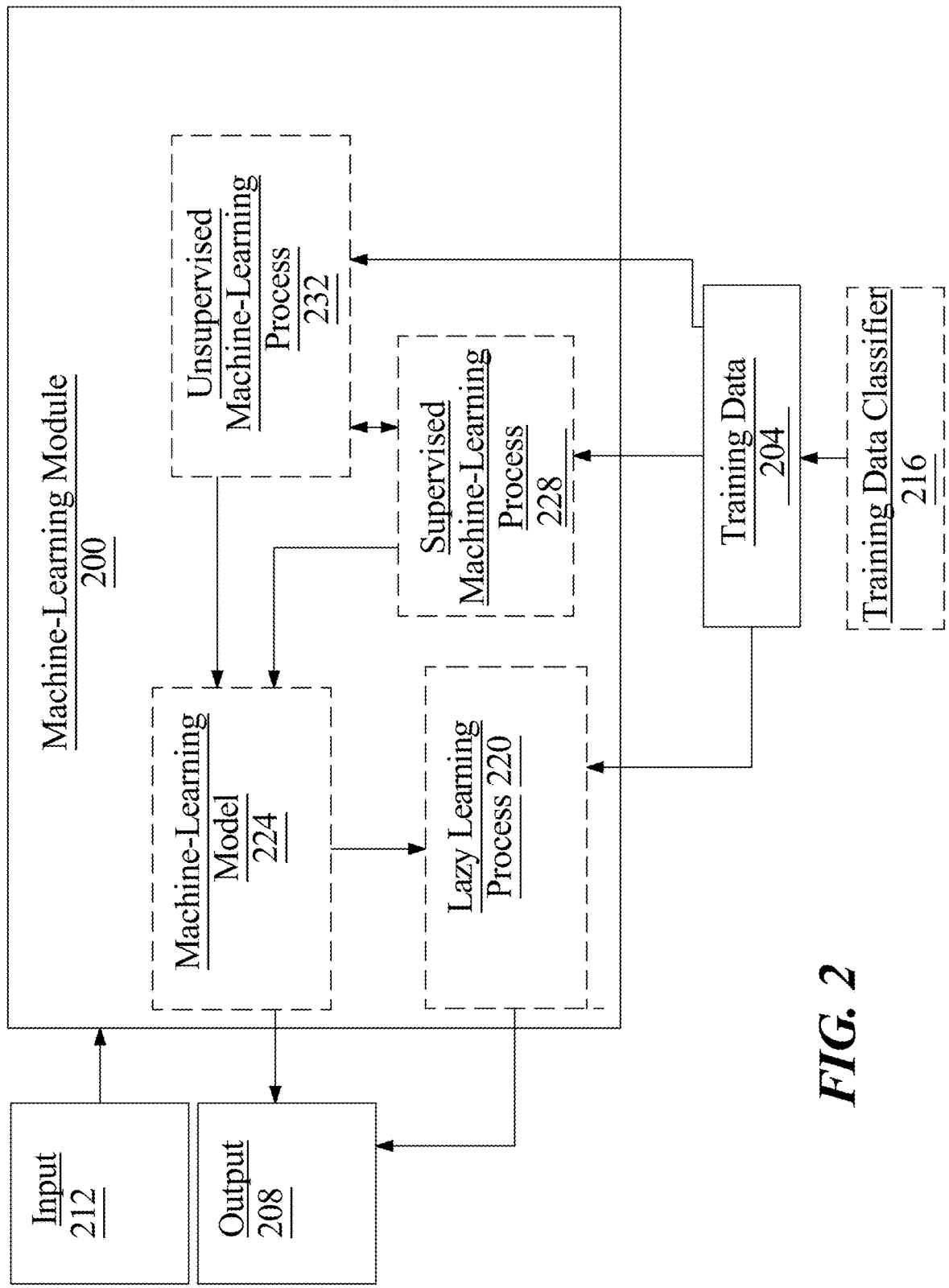
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatically uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may input and outputs described in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
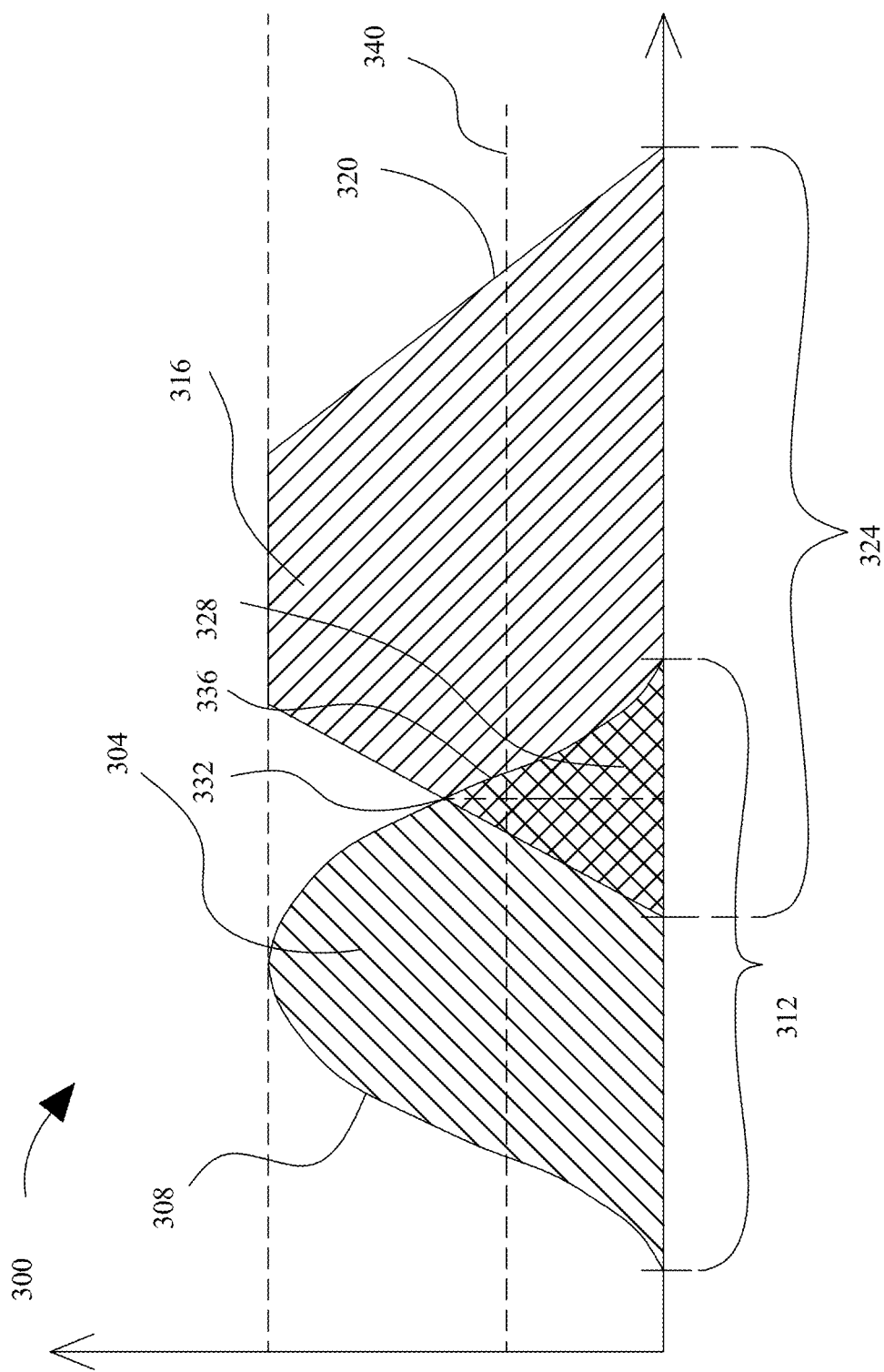
FIG. 3 is a graph illustrating an exemplary relationship between fuzzy sets.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models such as a pecuniary program, plurality of target sets, and an achievability criterion. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and/or target sets and a predetermined class, such as without limitation an achievability criterion, for combination to occur as described above. Alternatively or additionally, each threshold may be tuned by a machine-learning and/or statistical process, for instance and without limitation as described in further detail below.

Further referring to FIG. 3, in an embodiment, a degree of match between fuzzy sets may be used to classify a target set with an achievability criterion. For instance, if a target set has a fuzzy set matching an achievability criterion fuzzy set by having a degree of overlap exceeding a threshold, computing device 104 may classify the target sets as belonging to the achievability criterion. Where multiple fuzzy matches are performed, degrees of match for each respective fuzzy set may be computed and aggregated through, for instance, addition, averaging, or the like, to determine an overall degree of match.

Still referring to FIG. 3, in an embodiment, a target set may be compared to multiple achievability criterion fuzzy sets. For instance, target set may be represented by a fuzzy set that is compared to each of the multiple an achievability criterion fuzzy sets; and a degree of overlap exceeding a threshold between the target sets fuzzy set and any of the multiple an achievability criterion fuzzy sets may cause computing device 104 to classify the target set as belonging to an achievability criterion. For instance, in one embodiment there may be two achievability criterion fuzzy sets, representing respectively a first achievability criterion and a second achievability criterion. First achievability criterion may have a first fuzzy set; Second achievability criterion may have a second fuzzy set; and target set may have a target set fuzzy set. Computing device 104, for example, may compare a target set fuzzy set with each of first achievability criterion fuzzy set and second achievability criterion fuzzy set, as described above, and classify a target set to either, both, or neither of an achievability criterion or an achievability criterion. Machine-learning methods as described throughout may, in a non-limiting example, generate coefficients used in fuzzy set equations as described above, such as without limitation x, c, and σ of a Gaussian set as described above, as outputs of machine-learning methods. Likewise, target sets may be used indirectly to determine a fuzzy set, as target sets fuzzy set may be derived from outputs of one or more machine-learning models that take the target sets directly or indirectly as inputs.

Still referring to FIG. 3, computing device 104 may use a logic comparison program, such as, but not limited to, a fuzzy logic model to determine an achievability score. An achievability score may include, but is not limited to, aggressive, average, slow, efficient, perfect, ideal, disadvantageous, stable, unstable, and strenuous and the like; each such achievability score may be represented as a value for a linguistic variable representing the achievability score, or in other words a fuzzy set as described above that corresponds to a degree of practicality as calculated using any statistical, machine-learning, or other method that may occur to a person skilled in the art upon reviewing the entirety of this disclosure. In other words, a given element of a target set may have a first non-zero value for membership in a first linguistic variable value such as "aggressive," and a second non-zero value for membership in a second linguistic variable value such as "efficient". In some embodiments, determining an achievability score may include using a linear regression model. A linear regression model may include a machine learning model. A linear regression model may be configured to map data of target sets, such as steps to building financial savings, to one or more achievability scores. A linear regression model may be trained using any data described throughout this disclosure. In some embodiments, determining an achievability score of target sets may include using an achievability score classification model. An achievability score classification model may be configured to input collected data and cluster data to a centroid based on, but not limited to, frequency of appearance, linguistic indicators of difficulty, and the like. Centroids may include scores assigned to them such that elements of a target set may each be assigned a score. In some embodiments, an achievability score classification model may include a K-means clustering model. In some embodiments, an achievability score classification model may include a particle swarm optimization model. In some embodiments, determining an achievability score of target sets may include using a fuzzy inference engine. A fuzzy inference engine may be configured to map one or more target sets data elements using fuzzy logic. In some embodiments, a plurality of entity assessment devices may be arranged by a logic comparison program into achievability score arrangements. An "achievability score arrangement" as used in this disclosure is any grouping of objects and/or data based on skill level and/or output score. This step may be implemented as described above in FIG. 1. Membership function coefficients and/or constants as described above may be tuned according to classification and/or clustering algorithms. For instance, and without limitation, a clustering algorithm may determine a Gaussian or other distribution of questions about a centroid corresponding to a given difficulty level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 3, an inference engine may be implemented according to input and/or output membership functions and/or linguistic variables. For instance, a first linguistic variable may represent a first measurable value pertaining to an element of a target set, such as a degree of practicality of an element of the target set, while a second membership function may indicate a degree of difficulty of a subject thereof, or another measurable value pertaining to the target set. Continuing the example, an output linguistic variable may represent, without limitation, a score value. An inference engine may combine rules, such as: "if the difficulty level is 'hard' and the practicality level is 'high', the achievability score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 4:
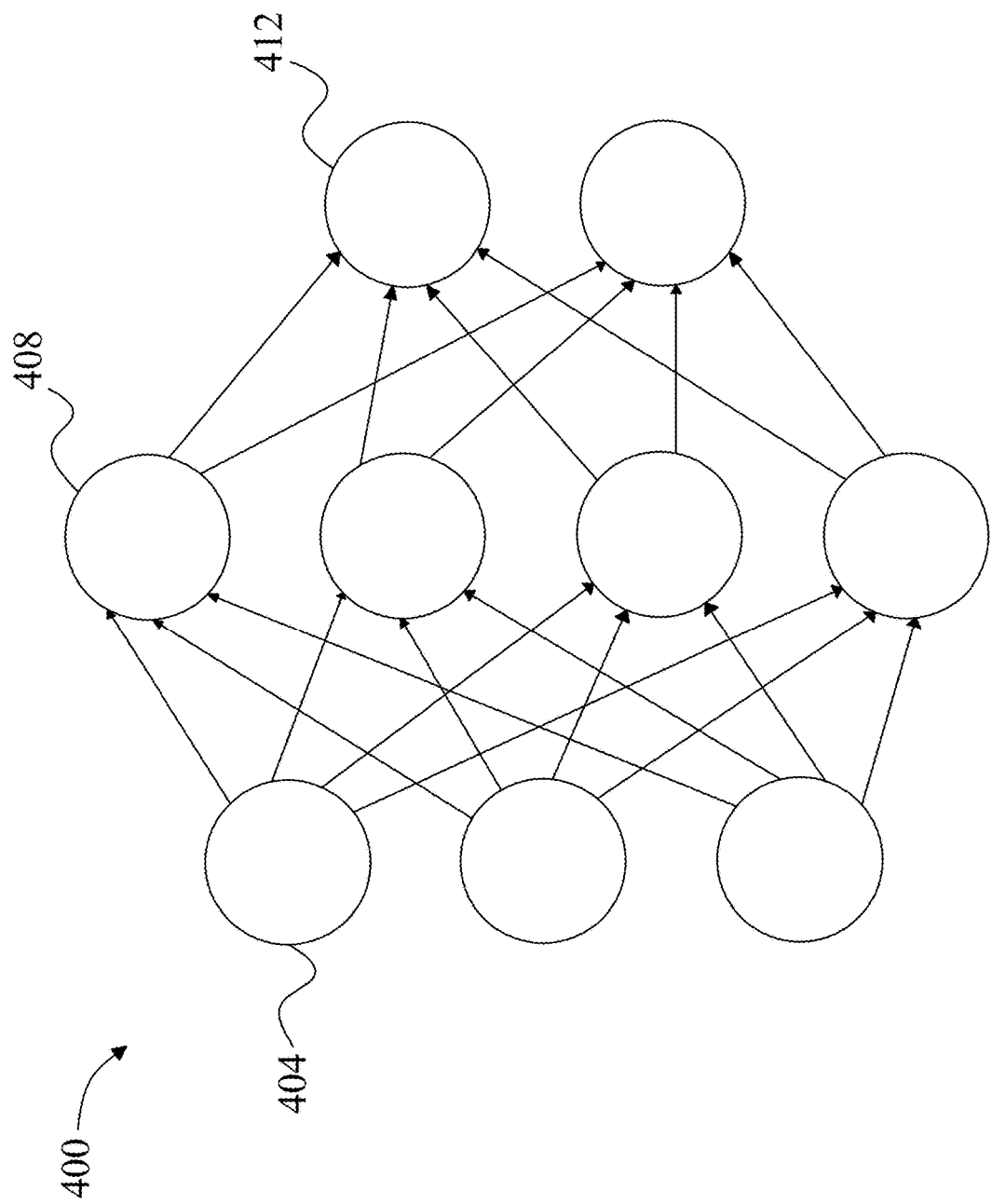
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
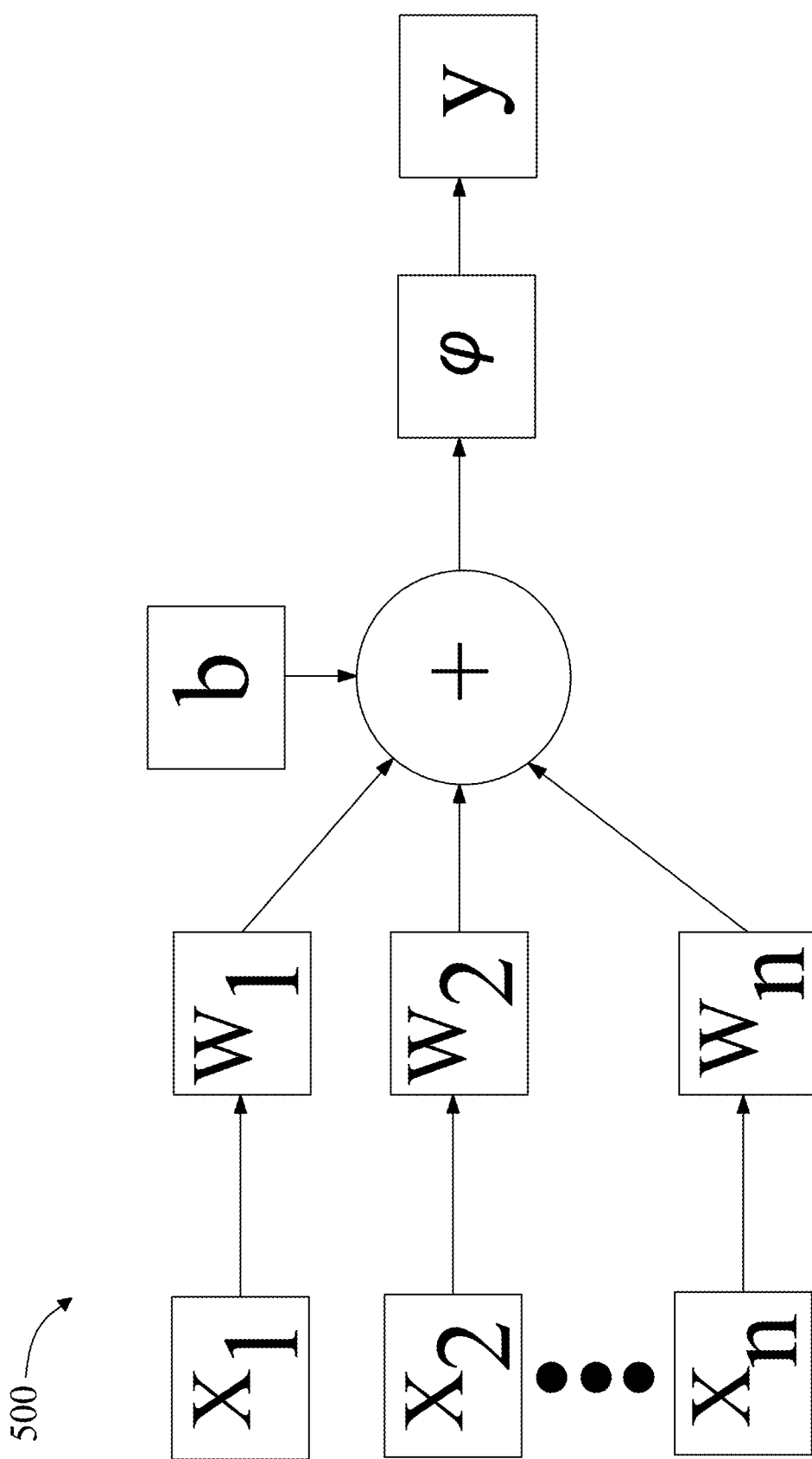
FIG. 5 is a diagram of an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
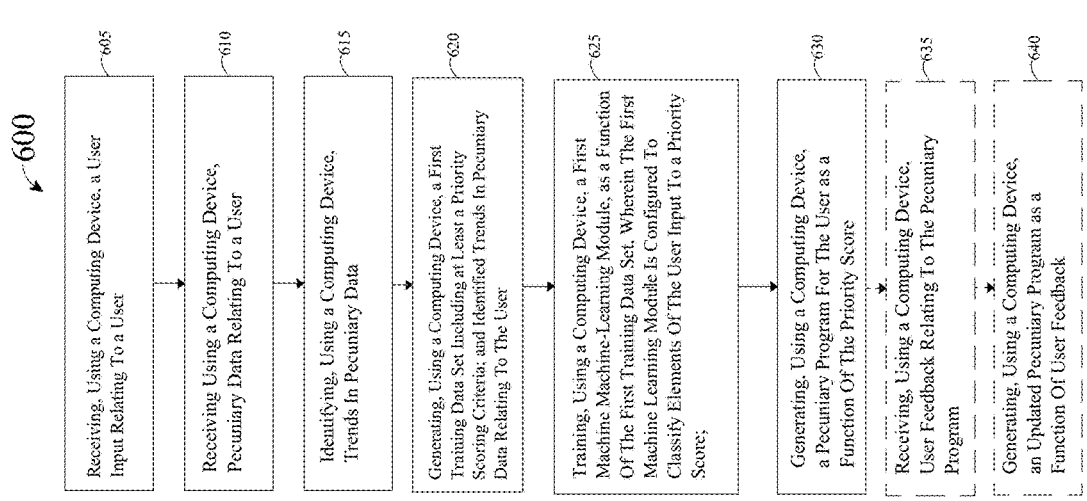
FIG. 6 is a flow diagram of an exemplary method for generating a pecuniary program.

Referring now to FIG. 6, is an exemplary flow diagram of a method 600 for generating a pecuniary program. A pecuniary program may be a pecuniary program as defined in FIG. 1. Method 600 may be performed using a computing device described through this disclosure, for example and with reference to FIG. 1. At step 605, method 600 includes receiving, using a computing device, a user input relating to a user. A user may be a person. User input, as defined and exemplified in FIG. 1, may include name, age, nationality, pecuniary goals, goal timeline, and similar aspects of information. All data relating to a user, such as user input and pecuniary data, may be received from a user database as defined and exemplified in FIG. 1. At step 610, method 600 includes receiving, using a computing device, pecuniary data relating to a user. Pecuniary data, as defined and exemplified in FIG. 1, may include income, debts, bills, credit reports, banks enrolled in, number of bank accounts, investment history net worth, and similar forms of financial information. Pecuniary data may be received from be received from user database. In some embodiments, pecuniary data may be received be from a third-party financial institution, for example and with reference to FIG. 1.

Still referring to FIG. 6, at step 615, method 600 includes identifying, using a computing device, trends in pecuniary data. Pecuniary data may include financial trends of the user such as trends in user paying debts late and/or on time, trends regarding investments, trends in savings management, for example and with reference to FIG. 1. Trends may represent a positive and/or negative financial history of the user as described in FIG. 1. Trends may be identified using a machine learning process as exemplified and defined in FIGS. 1-5 and 7. In an embodiment, a language processing model may be used to correlate positive and negative trends in a user's financial history, for example and with reference to FIG. 1. At step 620, method 600 includes generating, using a computing device, a first training data set including at least a priority scoring criteria and a plurality of identified trends in pecuniary data relating to the user. A priority scoring criteria, as defined in FIG. 1, may include a set of standards exampling what ideal financial stability for the average user is, such as, ideal income, savings, investments, debt balance, and similar standards as exemplified above. Identified trends in pecuniary data may be used to correlate user's goal to priority scoring criteria. Additionally, personal information such as age, nationally, and other aspects may be populated into first training data set. At step 625, method 600 classifying, using the computing device, at least an element of the user input to a priority score using a first machine-learning model, wherein classifying the at an element of the user input comprises training a first machine machine-learning model, as a function of the first training data set using the computing device, for example and with reference to FIG. 1. In some embodiments, first machine learning model may include a classifier as exemplified at least in FIGS. 1 and 2.

Still referring to FIG. 6, at step 630, method 600 includes generating, using a computing device, a pecuniary program for a user as a function of the priority score, for example and with refence to FIG. 1. Pecuniary program may include a plurality of target sets for user selection as defined and exemplified above. In some embodiments, each target set of the plurality of target sets may include educational data relating to pecuniary literacy. Educational data may include tools such as graphs, glossaries, pictures, drawings, abstracts, videos, power points, websites, website hyperlinks, focused on educating the user on how the pecuniary program works and what it means exactly. For example, breaking down complex financial terms by using more common vocabulary the average person may understand better. Educational tools may explain the differences among the ranked target sets to one another, how a credit score works, different types of investments the user can make, different type of savings account available, common resources like government financial assistance programs a user may qualify for. In some embodiments, each target set of the plurality of target sets may ranked based on achievability criteria as define above. In some embodiments, generating the pecuniary program and ranking the plurality of target sets may use a machine-learning model as described above. In some embodiments, ranking the plurality of target sets may include a fuzzy set comparison system as described in FIG. 1. The pecuniary program may then be outputted to a remote device operated by user, such as a smart phone or laptop. The remote device may be communicatively connected to a computing device as described above. In some embodiments, pecuniary program may be outputted to a user on a monthly, weekly, or daily basis to continuously advise the user on how to solve issues, financial educational, and reach goals in selected the time frame. In an embodiment, the user may give permission to allow the computing device to automatically access banking accounts and other information to carry out aspects of pecuniary program. For example, a user may give permission for the computing device to access their checking account and move a certain amount of money, based on the recommendation, to the user's savings account. In another example, the user may give the computing device permission to access bank accounts and automatically pay off bills such as student loans, utility bills, mortgages, and the like. Authorization for the computing device to carry out aspects of pecuniary program may include using third-party billing companies, debt consolation companies, credit agencies, and the like.

Still referring got FIG. 6, at step 635, method 600 may include receiving, using a computing device, user feedback relating to the pecuniary program, for example and with reference to FIG. 1. The computing device may output to a remote device, operated by the user, an open-ended form a user may respond to with a detailed impressions of the target sets in the pecuniary program suggested to the user. In an embodiment, the user may select a target set and critique it with suggestions of their own personal alterations. In an embodiment, feedback from a user may include the user pointing out which suggestions they like from each target set and/or what they did not like. User feedback may be uploaded and received by the computing device through user database. At step 640, method 600 may include generating, using a computing device, an updated pecuniary program as a function of user feedback, for example and with reference to FIG. 1. In an embodiment, an updated pecuniary program, as defined above, may just be one target set combining all the feedback from the user. In an embodiment, the updated pecuniary program may contain a new plurality of target sets. The updated pecuniary program may be generated used similar machine-learning processes and disclosed above. In some embodiments, the computing device may generate a second training data set, wherein the second training data set includes at least the user feedback relating to the pecuniary program. The computing device may then train a second machine learning model, such as a classifier, wherein pecuniary program is used as an input and weighted against second training data set to output updated pecuniary program. The updated pecuniary program may be outputted to remote device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
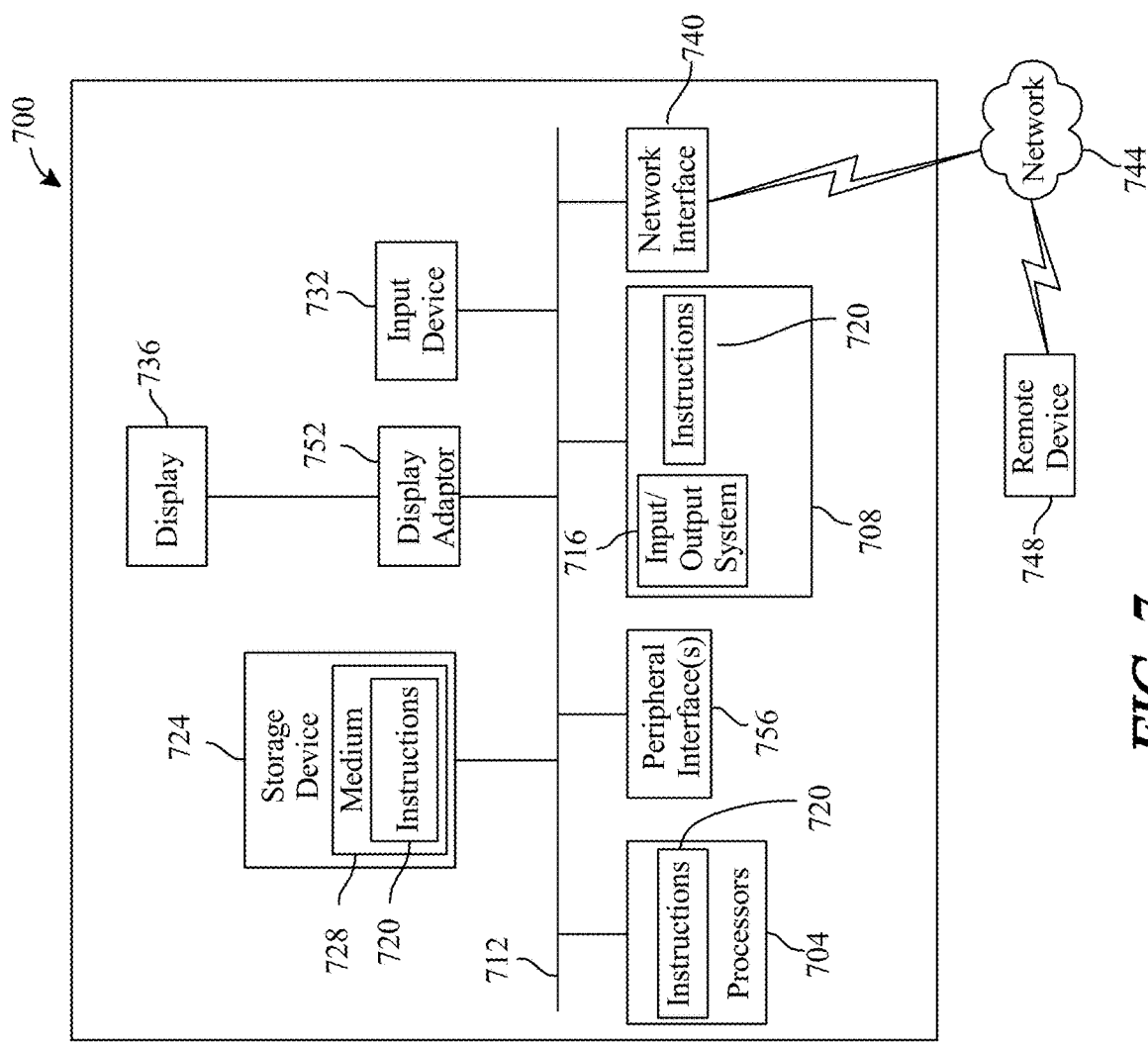
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a pecuniary program, the apparatus comprising a computing device, wherein the computing device comprises:
    at least a processor; and
    a memory communicatively connected to the at least processor, the memory containing instructions configuring the at least processor to:
    receive a user input relating to a user;
    receive pecuniary data relating to the user;
    identify a plurality of trends in the pecuniary data;
    generate a first training data set comprising:
        at least a priority scoring criteria; and
        a plurality of a plurality of identified trends in the pecuniary data relating to the user;
    classify at least an element of the user input to a priority score using a first machine-learning model, wherein classifying the at least an element of the user input comprises training a first machine machine-learning model, wherein training the first machine learning model comprises:
        correlating a plurality of data entries containing a plurality of user inputs as inputs correlated to a plurality of priority scores as outputs;
        updating the first training data set with input and output results from the first machine machine-learning model; and
        retraining the first machine machine-learning with an updated first training data set; and
    generate a pecuniary program for the user as a function of the priority score.

2. The apparatus of claim 1, wherein the user input includes a goal timeline.

3. The apparatus of claim 1, wherein identifying trends in pecuniary data includes using a language processing model.

4. The apparatus of claim 1, wherein the identified trends in pecuniary data represent a negative pecuniary history of the user.

5. The apparatus of claim 1, wherein the pecuniary program includes a plurality of target sets for user selection.

6. The apparatus of claim 5, wherein each target set of the plurality of target sets includes educational data relating to pecuniary literacy.

7. The apparatus of claim 5, wherein each target set of the plurality of target sets is ranked based on achievability criteria.

8. The apparatus of claim 7, wherein ranking the plurality of target sets comprises fuzzy set comparison.

9. The apparatus of claim 1, wherein the memory contains instructions further configuring the at least a processor to receive user feedback relating to the pecuniary program.

10. The apparatus of claim 9, wherein the memory contains instructions further configuring the at least a processor to generate an updated pecuniary program as a function of user feedback.

11. A method for generating a pecuniary program, the method comprising:
    receiving, using a computing device, a user input relating to a user;
    receiving using a computing device, pecuniary data relating to a user;
    identifying, using the computing device, trends in pecuniary data;
    generating, using the computing device, a first training data set comprising:
        at least a priority scoring criteria; and
        a plurality of identified trends in pecuniary data relating to the user;
    classifying, using the computing device, at least an element of the user input to a priority score using a first machine-learning model, wherein classifying the at least an element of the user input comprises training a first machine machine-learning model, wherein training the first machine learning model comprises:
        correlating a plurality of data entries containing a plurality of user inputs as inputs correlated to a plurality of priority scores as outputs;
        updating the first training data set with input and output results from the first machine machine-learning model; and
        retraining the first machine machine-learning with an updated first training data set; and
    generating, using the computing device, a pecuniary program for the user as a function of the priority score.

12. The method of claim 11, wherein the user input includes a goal timeline.

13. The method of claim 11, wherein identifying trends in pecuniary data comprises using a language processing model.

14. The method of claim 11, wherein the identified trends in pecuniary data represent a negative pecuniary history of the user.

15. The method of claim 11, wherein the pecuniary program includes a plurality of target sets for user selection.

16. The method of claim 15, wherein each target set of the plurality of target sets includes educational data relating to pecuniary literacy.

17. The method of claim 15, wherein each target set of the plurality of target sets is ranked based on achievability criteria.

18. The method of claim 17, wherein ranking the plurality of target sets comprises fuzzy set comparison.

19. The method of claim 11, further comprising receiving, using the computing device, user feedback relating to the pecuniary program.

20. The method of claim 19, further comprising generating, using the computing device, an updated pecuniary program as a function of user feedback.

* * * * *